H. C. SCHUMACHER.
SHUCK FEEDING MECHANISM FOR BOX FILLING MACHINES.
APPLICATION FILED JAN. 21, 1920.

1,388,668. Patented Aug. 23, 1921.
7 SHEETS—SHEET 1.

H. C. SCHUMACHER.
SHUCK FEEDING MECHANISM FOR BOX FILLING MACHINES.
APPLICATION FILED JAN. 21, 1920.

1,388,668.

Patented Aug. 23, 1921.

Inventor
Henry C. Schumacher
by his Attorney
John F. Nolan

H. C. SCHUMACHER.
SHUCK FEEDING MECHANISM FOR BOX FILLING MACHINES.
APPLICATION FILED JAN. 21, 1920.

1,388,668.

Patented Aug. 23, 1921.
7 SHEETS—SHEET 7.

Inventor
Henry C. Schumacher
by his Attorney
John T. Nolan

UNITED STATES PATENT OFFICE.

HENRY C. SCHUMACHER, OF BARBERTON, OHIO, ASSIGNOR TO THE DIAMOND MATCH COMPANY, OF CHICAGO, ILLINOIS, A CORPORATION OF ILLINOIS.

SHUCK-FEEDING MECHANISM FOR BOX-FILLING MACHINES.

1,388,668.

Specification of Letters Patent.  Patented Aug. 23, 1921.

Application filed January 21, 1920. Serial No. 353,035.

*To all whom it may concern:*

Be it known that I, HENRY C. SCHUMACHER, a citizen of the United States, and resident of Barberton, in the county of Summit and State of Ohio, have invented certain new and useful Improvements in Shuck-Feeding Mechanisms for Box-Filling Machines, of which the following is a specification.

This invention relates to machines for filling and closing the tray-and-shuck form of box commonly employed for holding matches, having relation more especially to mechanism for feeding box shucks or covers to the tray conveyer of a filling machine, such, for example, as is illustrated in Letters Patent of the United States No. 1,064,452, dated June 10, 1913, to which reference may be had.

The object of my invention is to effect the delivery of the box shucks or covers with accuracy and increased rapidity to the tray conveyer, and thereby insure a more rapid operation of the filling machine, with correspondingly increased production, than formerly.

To this end, the invention comprises novel features of construction and combinations of parts which will be hereinafter described and claimed.

In the drawings—

Fig. 15ª is a view, similar to Fig. 10, showing a slightly modified arrangement of the lower feed-belt pulley and the shuck-supporting devices adjacent the inlet of the chute.

Referring to the drawings, 20 designates a horizontal bed or table supported adjacent the delivery portion of a match making machine; 21 designates an endless conveyer which is arranged to travel continuously on the bed and transport a succession of box trays (*a*) across the path of the matches being discharged from the match machine, and 22 designates a conveyer which is arranged to travel adjacent to one side of and concurrently with the tray conveyer and is adapted to transport a succession of box shucks (*b*) in endwise relation to the filled trays on the tray conveyer. 23 designates a conveyer which is arranged to travel adjacent the other side of the tray conveyer and is adapted to transport a succession of plungers 24 in operative relation to a stationary cam way 25 which successively reciprocates said plungers across the path of the tray conveyer in a manner to push the filled trays progressively into the opposing shucks on the shuck conveyer.

The mechanisms above referred to are or may be similar in construction and operation to the corresponding mechanisms shown and described in Patent No. 1,064,452 aforesaid, and therefore they require no specific description herein.

Figure 3:
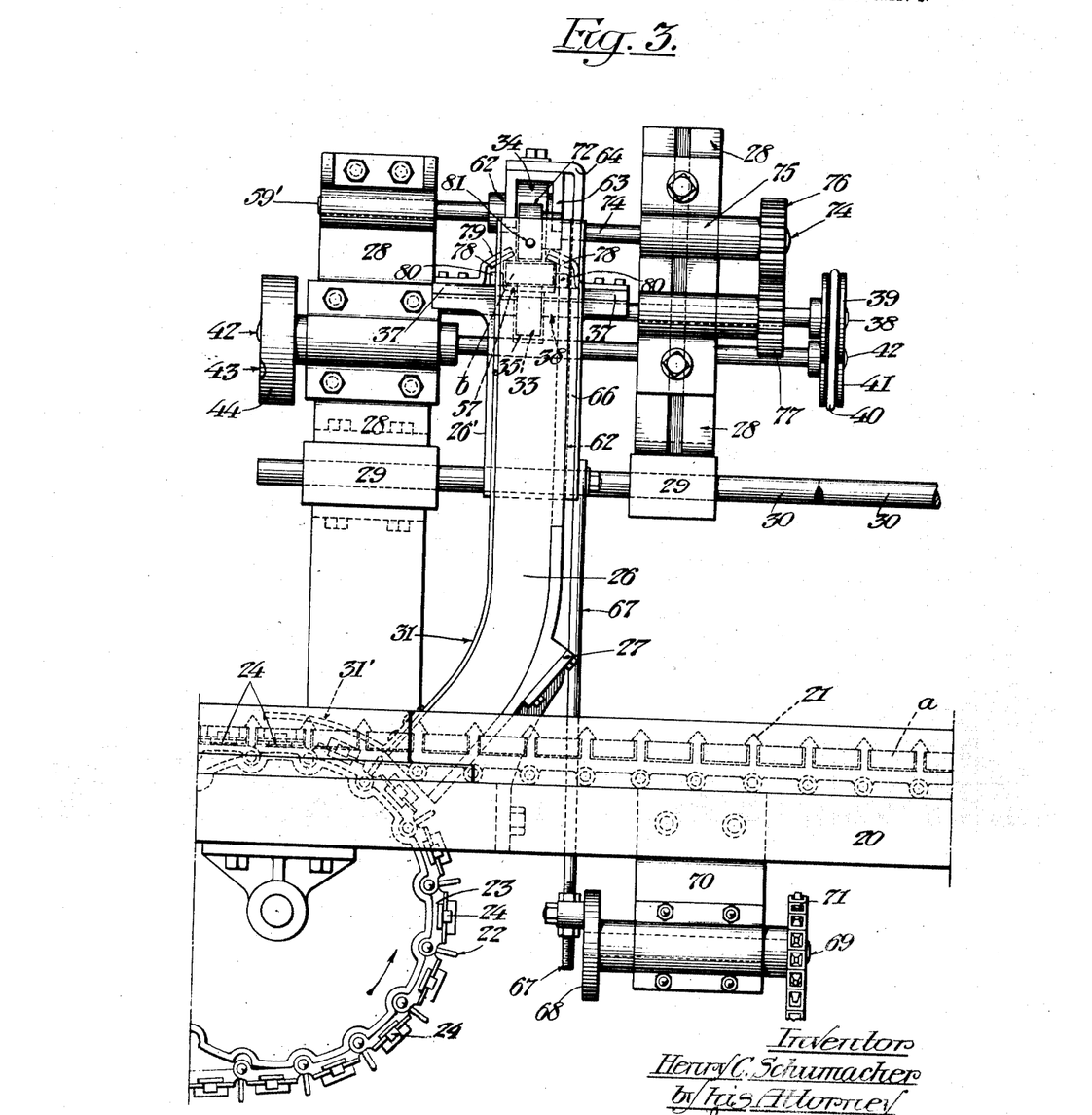
Fig. 3 is a front elevation, enlarged, of the delivery end of the shuck feeding mechanism, showing portions of the tray and plunger conveyers of the filling machine.
Figure 4:
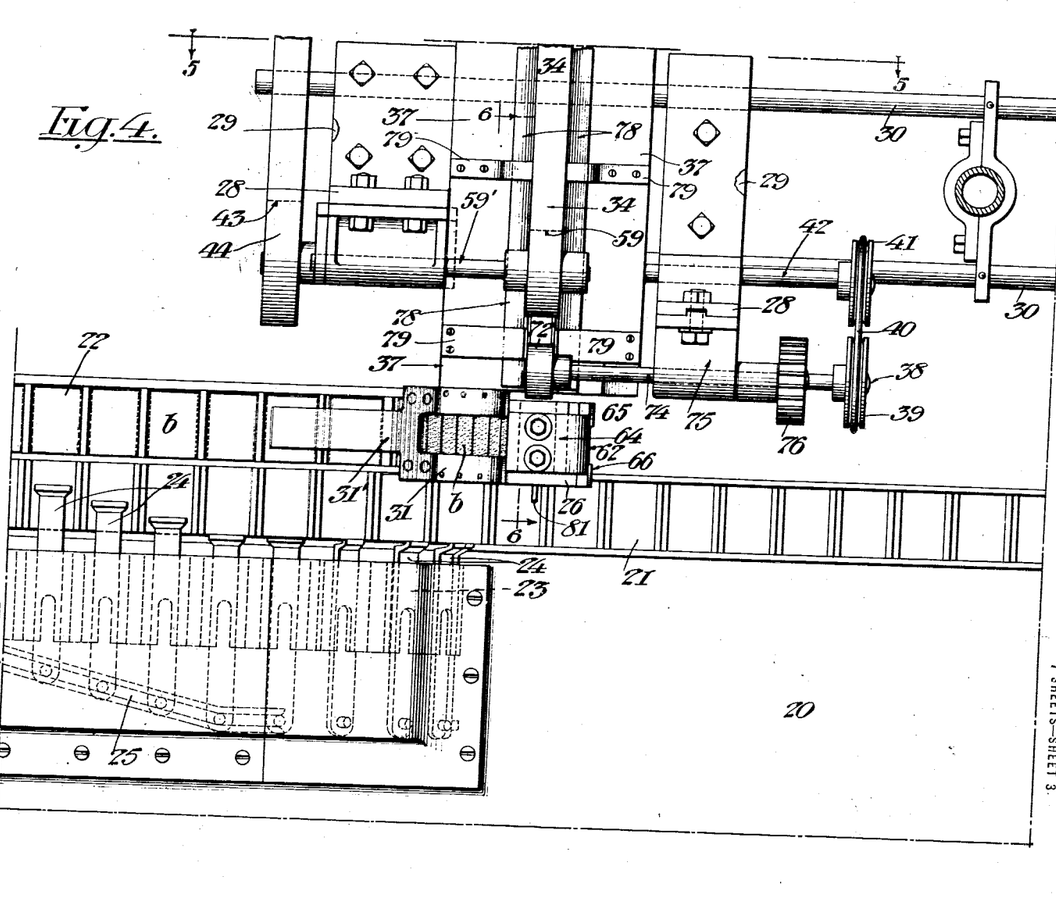
Fig. 4 is a plan of the mechanism shown in Fig. 3, and the associated parts of the filling machine; showing, in addition, a portion of the shuck conveyer.
Figure 5:
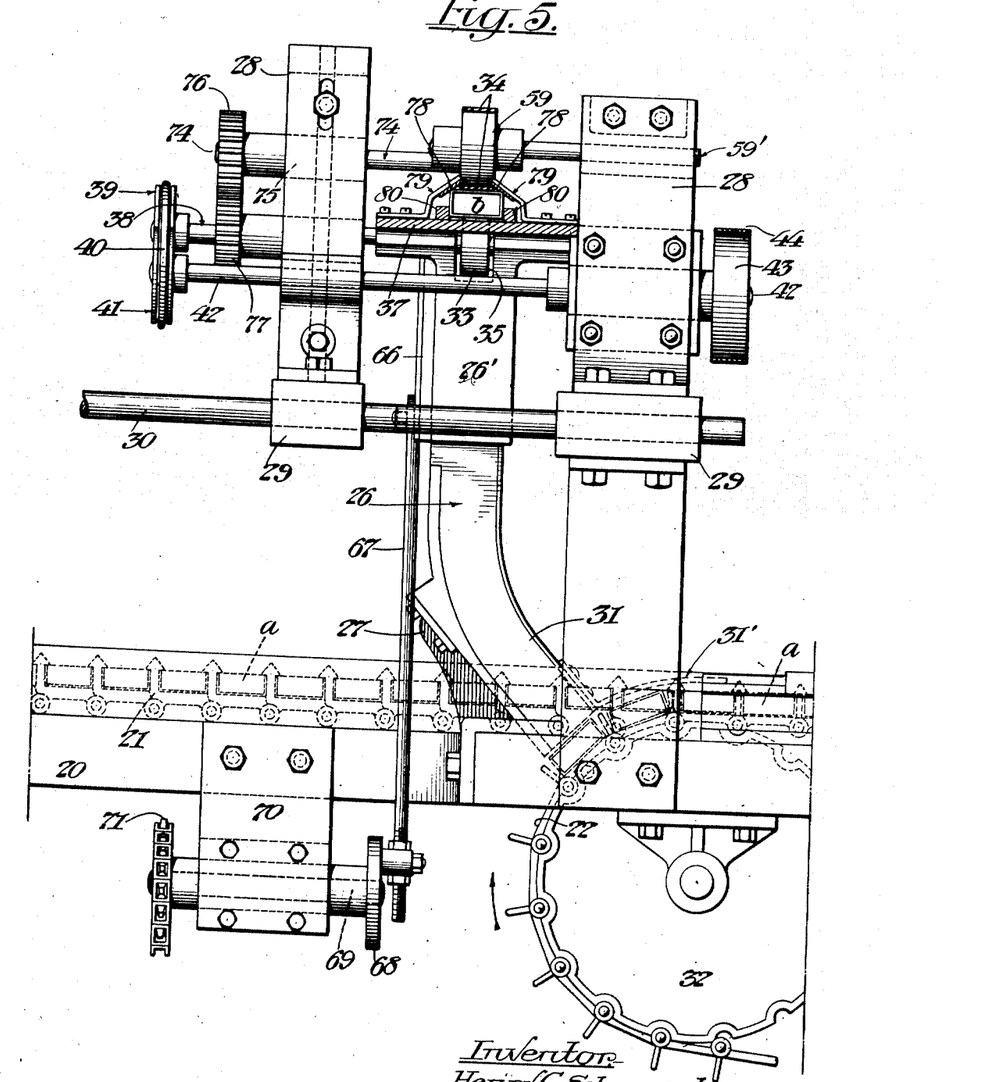
Fig. 5 is a transverse section through the shuck feeding mechanism, as on the line 5—5 of Fig. 4.
Figure 6:
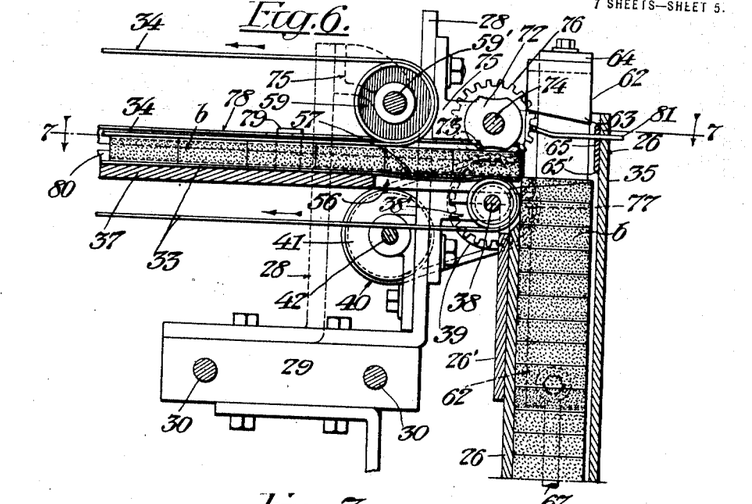
Fig. 6 is a vertical section through the upper part of the shuck chute and the devices for feeding the shucks thereto, as on the line 6—6 of Fig. 4.
Figure 7:
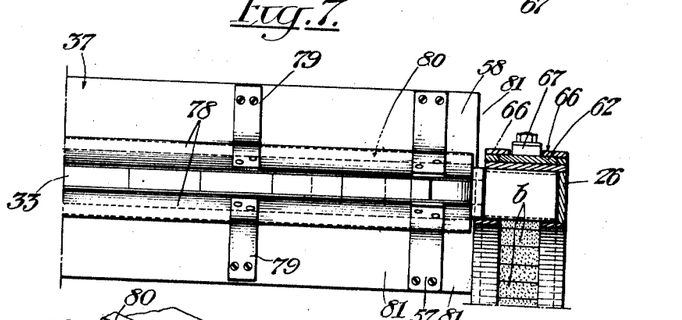
Fig. 7 is a horizontal section, as on the line 7—7 of Fig. 6.
Figure 8:
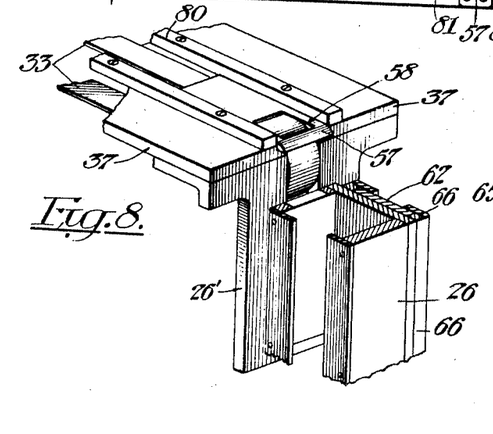
Fig. 8 is a perspective view of the delivery end of the lower feed belt and adjuncts, showing the adjacent portion of the shuck chute in section.
Figure 9:
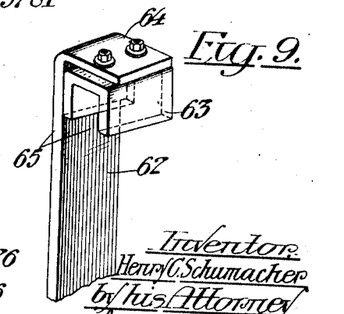
Fig. 9 is a similar view of the plunger head for depressing the shucks in the chute.
Figure 10:
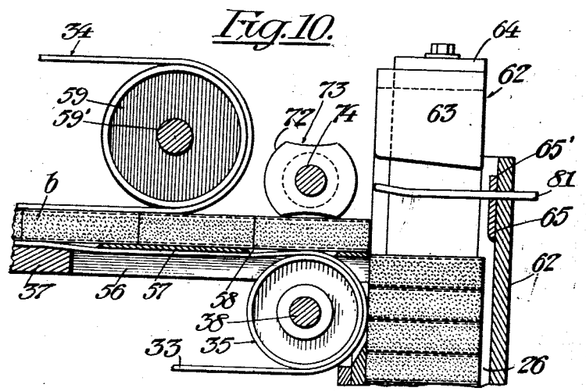
Figs. 10, 11 and 12 are vertical sections, partly in elevation, of the upper portion of the shuck chute and adjacent parts, showing successive positions of the plunger head and the feed roll in relation to the leading shuck and said chute.
Figure 11:
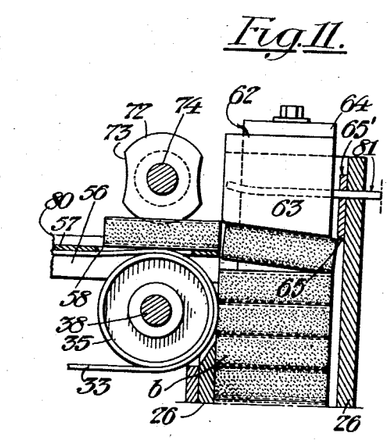
Figure 12:
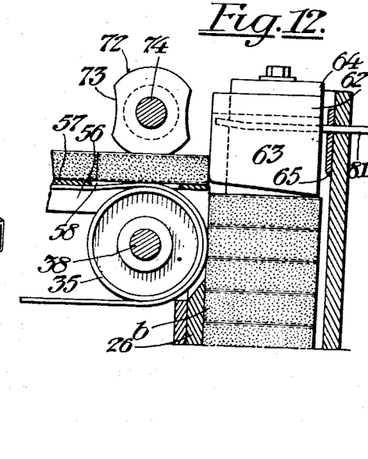
Figure 13:
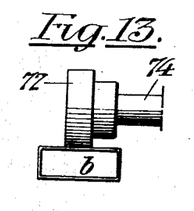
Figs. 13 and 14 are details of the roll and shuck as in the relative positions indicated in Figs. 10 and 12 respectively.
Figure 14:
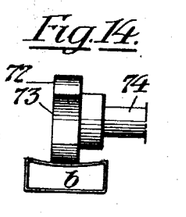

26 designates a vertically-disposed chute which is supported at its lower or delivery end by a bracket 27 on the bed. The upper or receiving end of the chute is affixed to a bracket 26' depending from one end of a long horizontal bed 37 hereinafter referred to. The lower end portion 31 of the chute is curved toward the links of the shuck conveyer 22 and in proximity to their path as they pass upward to a horizontal plane when rounding the wheel 32 of the conveyer. This chute is rectangular in cross-section and is designed to receive the shucks successively at its upper end and feed them downward side by side to and through the lower portion 31, the curvature of which is such as to direct them consecutively to and into the succeeding links of the shuck conveyer. (See Figs. 3 and 5.) A curved guard strip 31' is secured to the lower end of the chute so as to overhang the adjacent links of the shuck conveyer.

The shucks are fed in rapid succession toward the upper end of the chute by means of the upper and lower spaced apart horizontal runs of a pair of continuously driven belt conveyers 33, 34 by and between which the shucks are gripped and carried in endwise relation to each other from a suitable shuck supplying mechanism which will be hereinafter described.

The lower belt 33 passes about suitably-disposed pulleys 35, 36 at the respective ends of the bed 37 which extends outwardly from and at right angles to the upper end of the chute; the upper or acting run of the belt being flanked by a pair of shuck guide strips 80 on the bed. The shaft 38 of the pulley 35 adjacent the chute has its bearings in brackets 38' bolted to standards 28 which are affixed to cross-members 29 of a substantial framework 30 overhanging the bed. This shaft is provided with a pulley 39 which is connected by means of a belt 40 with a pulley 41 on one end of a lower shaft 42 having its bearings in boxes on the standards 28. The opposite end of the shaft 42 is provided with a pulley 43 which, in turn, is connected by means of a belt 44 with a pulley 45 on a shaft 46 located intermediate the ends of the bed 37. The shaft 46 bears a sprocket-wheel 47 which is connected by means of a chain 48 with a sprocket-wheel 49 on a driven shaft 50; said shafts 46, 50 having their bearings in brackets on the supporting frame 51 of the shuck applying mechanism above referred to. A pulley 52 on the shaft 50 is connected with and driven by the pulley 53 of a suitable motor 54 by means of a belt 55; the power thus being transmitted from the motor through the described connections to the belt 33.

The end of the bed 37 adjacent the chute is longitudinally slotted, as at 56, and a bridge plate 57 having an opening 58 therein adjacent its forward end is mounted on the bed so as to span the slot. The pulley 35 is so arranged that its upper peripheral portion turns in the slot 56 and opening 58 and thus maintains the proximate flexed portion of the belt 33 in substantially the same plane as the top of the bridge plate, while the body of the latter overlies the adjacent portion of the belt 33. (See Figs. 6, 7, 8, 10, 11 and 12).

The pulley 35 is arranged to extend into the proximate wall of the chute, (such wall being suitably open for the purpose), so as to advance the leading shuck of the row into the chute, which shuck before its delivery to the chute is partly supported on the bridge plate 57 for a purpose hereinafter described.

Figure 1:
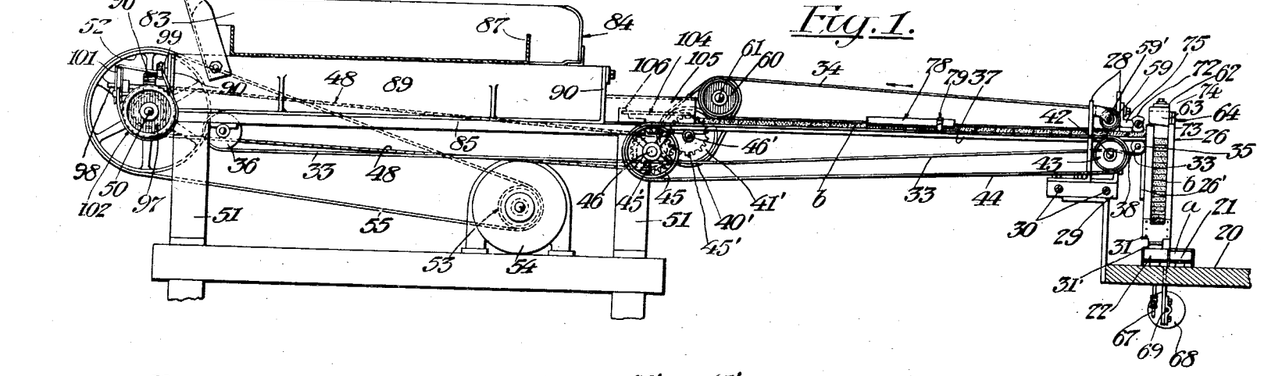
Figure 1 is a side elevation, partly in section, of shuck supplying and feeding mechanisms embodying my invention, certain parts being omitted for clearness, and only so much of the box filling machine being shown as is necessary to illustrate the invention.

The upper belt 34, which also contributes to the advancement of the row of shucks toward the chute, passes around suitably-disposed pulleys 59, 60 carried by shafts 59', 61 adjacent the respective shafts 38, 46. The shaft 46 is geared to an adjacent shaft 46' by co-acting gears 45' on the respective shafts, and the shaft 46' is provided with a pulley 41' which is connected by means of a belt 40' with a pulley 39' on the shaft 61. (See Figs. 1 and 2). Thus continuous motion is transmitted from the shaft 46 to the shaft 61.

As each succeeding shuck is delivered by the belt 33 to the top of the chute, such shuck is rapidly depressed within the chute a sufficient distance to permit the entry of the next succeeding shuck to the chute. This operation is effected by means of a vertically reciprocating plunger 62 having an overhanging head which enters the top of the chute and impinges upon the succeeding shucks as rapidly as they are delivered to the chute. This head in its preferred form comprises a ∩-shaped member 63 bolted to an angular bend 64 at the top of the plunger and so arranged as to travel in close relation to the inlet opening in the wall of the chute and thus act upon the upper lateral corners of the shuck when the shuck has been fully entered in the chute. (See Figs. 6, 7, 9, 10, 11 and 12).

The lower or acting surfaces of the depending side portions of the member 63 are formed at an angle to the horizontal plane of the underlying shuck, as shown, so that, in the descent of the plunger, its outer or lower end initially impinges against the opposing front end of the shuck and perforce depresses such end in advance of the rear end of the shuck, thus separating the latter from the top of the leading shuck of the row. Thereupon the inner portion of the member 63 contacts with such leading shuck and checks its advancement into the chute; the belts 33, 34 thus traveling idly against the row of restrained shucks.

The front wall of the chute is preferably provided directly opposite the inlet of the latter, with an internal shoulder, 65, constituted by the lower end of a plate 65', which shoulder is so located that when the shuck is initially depressed, the upper forward edge of the shuck clears the shoulder and allows the shuck to advance slightly. Thus the liability of a destructive drag of the opposing ends of the two shucks (that is, the shuck within the top of the chute and the leading shuck of the row) is prevented.

The plunger 62 is slidingly mounted in vertical guides 66 at one side of the chute, and is connected by means of a link 67 with the wrist of a crank disk 68 on a short shaft 69 having its bearings in a hanger 70 on the bed 20. This shaft 69 bears a sprocket-wheel 71 which is operatively connected with and driven from a shaft of the filling machine. (See Figs. 3 and 5).

The ends of the material of which the shucks are composed are sometimes not clean cut, and hence during the movement of the leading shuck into the chute, there is liability of the upper edge of such shuck engaging and meshing with the opposing upper edge of the uppermost shuck contained in the chute, upon which occurrence such ends would be ruptured or buckled. To obviate this liability I provide simple and efficient means whereby the top of each shuck immediately before its delivery to the chute is slightly depressed or bowed. Such means, in the form illustrated, comprises a roll 72 having spaced apart circumferential recesses 73 therein, which roll is fast on a shaft 74 mounted above and transversely of the leading shuck adjacent the chute. This shuck is well supported by the bridge plate 57 which overlies the belt 33 as above mentioned, and hence an effective action of the mutilated roll on the shuck is secured. The shaft of this roll has its bearings in boxes 75 on the standards 28, and is provided with a gear wheel 76 in mesh with a similar wheel 77 on the shaft 38 of the pulley 35, whereby motion is transmitted from the latter shaft to the roll. The roll is so positioned in relation to the path of the shucks that one of the recessed peripheral portions lies directly above the leading shuck immediately before the entrance of the latter into the upper end of the chute. (See Fig. 10.) When the roll is thus positioned the plunger head is in down position, thus closing the inlet opening of the chute and temporarily checking the progress of the leading shuck, as previously mentioned. When the plunger is raised sufficiently to clear the inlet opening, the succeeding uninterrupted peripheral portion of the roll bears upon and depresses the top of the underlying shuck and at the same time coöperates with the belt 33 positively to deliver said shuck to the chute. (See Figs. 11 and 12.) Thus the succeeding peripheral portions of the roll act upon the shucks as rapidly as they are advanced in proximity to the chute. When each shuck with its downwardly flexed or bowed top is entered in the chute, such top resumes its normal condition. See Fig. 15, wherein the forward or near shuck is downwardly depressed. The described construction of the plunger head permits it to span the top of the shuck and bear effectively upon the lateral corners of the latter when the shuck is entered in the chute.

The roll 72 runs at a relatively high speed, and the described formation thereof enables it to grip the opposing shuck and feed it more positively than a plain roll. This, in conjunction with the feed belts, keeps the shucks of the row in close endwise relation to each other and insures their advancement at a high speed. In the absence of the roll 72 if the belts are not accurately adjusted to secure just the proper frictional contact with the shucks, the shucks tend to fall back or to crowd ahead with too great a pressure, thus, in either case, causing trouble. By the provision of my improved feed construction, however, such trouble is obviated.

Figure 15:
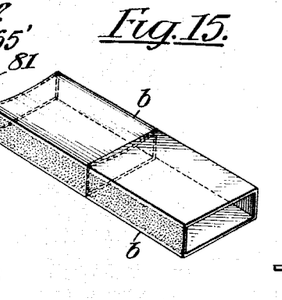
Fig. 15 is a perspective view of two contiguous shucks showing their relative positions when the leading shuck is entered in the chute, as illustrated in Fig. 12, preparatory to the down stroke of the plunger head.
Figure 15A:
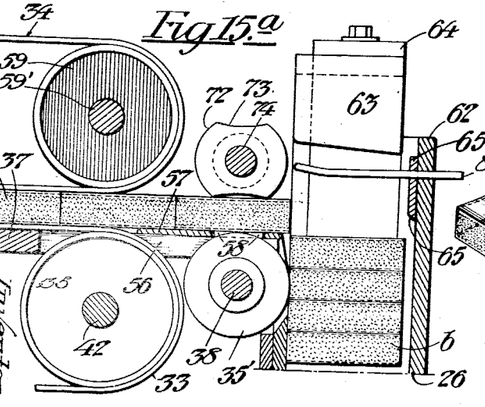

In Fig. 15ª I have shown a slight modification wherein the pulley 35 for the forward or delivery end of the lower feed belt 33 is mounted on the shaft 42 directly below the shaft 59' of the pulley 59 for the upper feed belt, and hence the leading shuck of the row escapes the two feed-belts before passing beneath and being acted upon by the rapidly rotating roll 72. In this construction a roll 35' is mounted on the shaft 38 in position to afford a support for the shuck when it is engaged by the roll 72, which latter, similarly to the first described construction, not only operates to depress or bow the top of each succeeding shuck presented thereto but also acts to feed the shuck positively and rapidly into the chute when the plunger is elevated to clear the inlet.

I preferably arrange above the path of the shucks on the belt 33, in the space between the pulley 60 and the chute, a pair of spaced apart converging plates 78 which are supported by angle brackets 79 on the bed 37.

These plates are oppositely inclined to the vertical so as to overhang the upper lateral corners of the shucks as the latter progress toward the chute. Such corners of the shucks contact with the opposing inclined surfaces of the plates and thus, without liability of rubbing frictional material on the long narrow sides of the shucks, the plates maintain the row of shucks in approximate alinement upon the lower belt 33.

81 is simply a guard finger which is arranged to extend into the space between the sides of the plunger and overhang each shuck when it is delivered to the chute, thus preventing accidental displacement of the shuck.

By the mechanism above described the shucks are delivered to and fed down the chute with great rapidity, and it is therefore necessary to supply the shucks with equal rapidity to the feed belt 33. For this purpose I provide the hopper structure and associated mechanism illustrated in Figs. 1 and 2 and Figs. 16 to 19, inclusive, whereby shucks promiscuously delivered to the hopper are automatically disposed in a row and delivered in an orderly manner to the feed belt.

Figure 2:
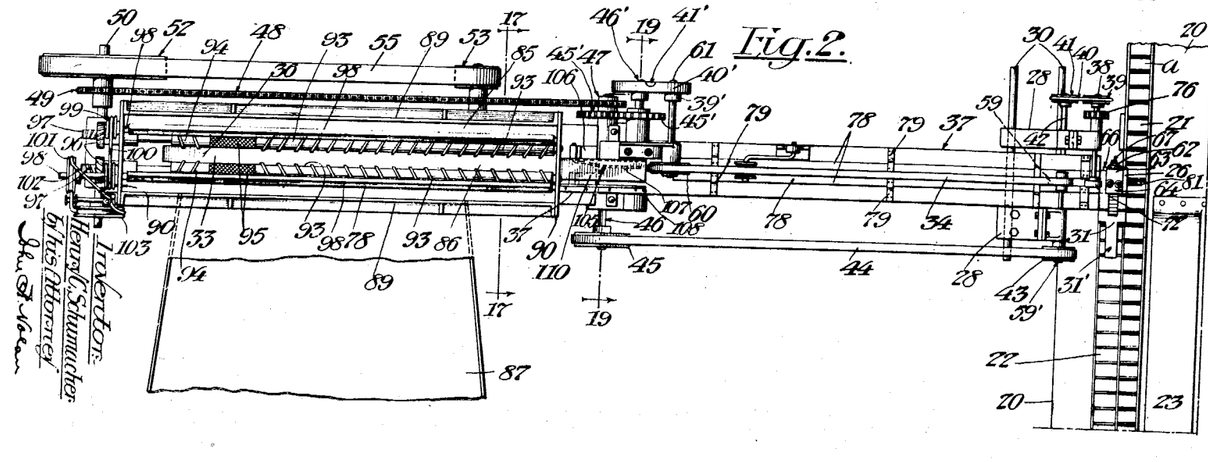
Fig. 2 is a plan of the said mechanisms and adjuncts.

The hopper structure includes a side wall 83, end walls 84, a bottom 85 having a central opening 86 extending throughout its entire length directly above the outer portions of the upper run of the belt 33, and an inclined feed chute 87 extending outwardly from the open side of the structure. The inner end wall 84 is provided with a depending V-shaped extension 88. The hopper structure is supported upon a casing comprising two spaced-apart side walls 89 and two end walls 90, the whole being supported on the bed 37. The inner end wall of the casing is provided with a median rectangular opening 91 at its lower edge directly above the belt, which opening constitutes a throat which is proportioned to permit the passage therethrough of a shuck resting on one of its long narrow sides on the belt. The extension 88 of the hopper structure depends adjacent to and slightly below the top of the throat. Mounted below the longitudinal opening 86, and extending longitudinally of the hopper, are two parallel shafts 92 having their bearings in the respective end walls 90. These shafts are spaced-apart a distance slightly greater than the narrow width of a box shuck and are provided throughout the greater part of their length up to or near to the throat 91, with helical ribs or screw-threads 93 whereof that of one shaft is pitched reversely of the other, as seen in Fig. 2. These threads terminate somewhat short of the ends of the shafts remote from the throat, and such ends are each provided with a threaded portion 94 and an intermediate unthreaded portion 95, the portion 94 of one shaft being reversely pitched to the thread 93 of the same shaft. The unthreaded portion 95 of the shafts is milled to facilitate the downward passage therebetween of any shucks that may be presented thereto, as hereinafter described. The screw shafts, as they may be termed, are continuously rotated toward each other in any suitable manner. In the present instance the ends of the shafts adjacent the outer end wall 90 are provided with spiral gears 96 in mesh with similar gears 97 on the power driven shaft 50 above referred to. Extending longitudinally of the screw shafts, and between the same and the sides of the hopper opening, are two parallel rectangular bars 98, which are mounted to rotate in bearings in the end walls 90, the outer ends of the bars being provided with pulleys 99 about which passes a crossed belt 100. The outer end of one of the bars is provided with a pulley 101 which is connected by means of a belt 102 with a pulley 103 on the driven shaft 50. Thus motion is transmitted to the bars 98 through a slip driving connection.

Supported upon and longitudinally of the bed 37 directly below the screw shafts and adjacent the respective edges of the belt 33, are two guide plates 104 which are spaced slightly greater than the height of a box shuck, thus providing a trough along which a shuck, when lying on one of its long narrow edges upon the belt, is guided toward the throat.

From the foregoing it will be seen that the screw shafts 92 are continuously rotated toward each other, and that box shucks promiscuously dumped on the chute 87 are delivered *en masse* to the hopper and caused to fall upon the rotating screw shafts and between the rotating bars 98. These bars in their rotation continuously agitate the shucks and insure their passage to and between the screw shafts, the slip connection constituted by the belts 100 and 102 and their respective pulleys preventing the jamming and rupturing of the shucks within the hopper structure and casing. The reversely extending threads 93 of the shafts coöperate to advance the shucks which are in contact therewith toward the right hand or delivery end of the structure, as viewed in Fig. 2. During the travel of the shucks upon and along the screw shafts one of the long narrow sides, or one of the ends, of such shucks works through the space between the two shafts, and thus the shucks are progressively deposited upon the feed belt 33 and between the guide plates 104. If a long narrow side of a shuck be thus imposed on and longitudinally of the belt the shuck will be advanced in that position by the belt and screw shafts to and through the discharge throat 91, but if the shuck be endwise imposed on the belt the upper end of the shuck will abut against the depending end extension 88 and be tipped over thereby in a manner to place one of its long narrow sides upon or in position to fall upon the belt. When thus positioned the shuck passes through the throat. Hence the succeeding shucks, end to end, with their long narrow sides resting on the belt, are caused to progress to and through the throat of the casing. The short threads 94 at the outer or left hand end of the shafts act in conjunction with the adjacent unthreaded portions of the latter, to prevent the crowding of the shucks at that end of the hopper, for the reason that the shucks resting on such threads 94 are agitated and positioned thereby in a manner to pass to and enter between the adjacent unthreaded portions 95 and thus descend to the belt.

Figures 16, 17, 18, 19:
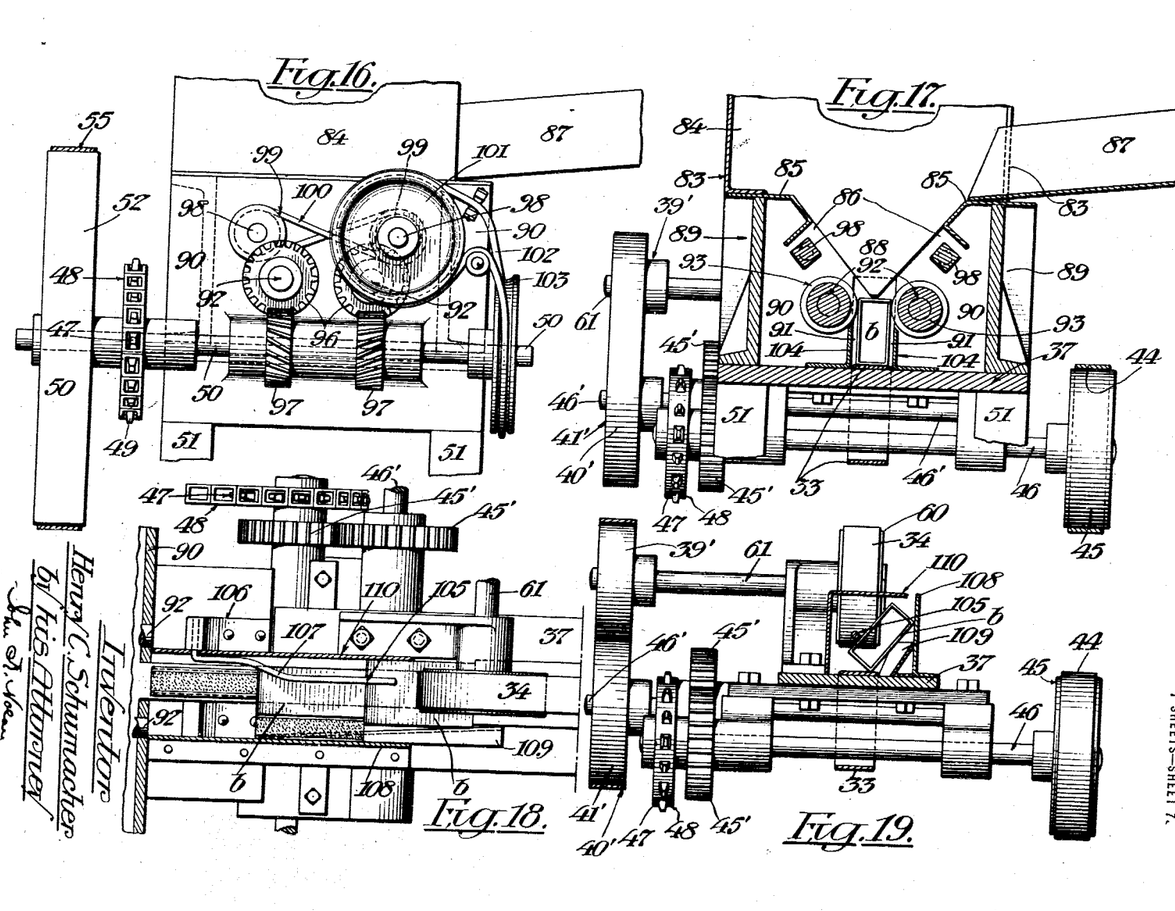
Fig. 16 is an end elevation of mechanism for automatically supplying the shucks to the feed belts.
Fig. 17 is a transverse section of said shuck supplying mechanism, as on the line 17—17 of Fig. 2.
Fig. 18 is a horizontal section adjacent the throat or discharging end of the shuck supplying mechanism, showing the devices for tilting the successive shucks and positioning them upon the active run of the lower feed belt.
Fig. 19 is a vertical section, as on the line 19—19 of Fig. 2.

Immediately after the shucks emerge from the throat they are tilted over upon their broad sides in succession. A simple and efficient means for this purpose comprises a rod 105 arranged adjacent the throat and above and longitudinally of the belt 33, one end of the rod being affixed to a bracket 106 on the bed, and the body of the rod being bent horizontally to constitute an inclined cam surface 107 which lies in the path of the upper portion of one of the vertical sides of the shuck. When the shuck advances against the opposing cam surface the shuck is bodily tilted over against a longitudinally-extending wall 108 which is supported on the bed beyond one edge of the belt. Supported also on the bed, between the belt and the wall 108, is a longitudinally-extending cam plate 109. As the tilted shuck is advanced by the belt, the cam plate permits the shuck gradually to assume a horizontal position as indicated in Fig. 18 and directs it, broad side downward, upon said belt and beneath the lower run of the upper belt. The succeeding shucks thus positioned between the two belts are advanced thereby toward the chute 26 as previously described.

Preferably a guard plate 110 overhangs the shucks in the region of the tilting devices, which plate is conveniently provided by the horizontal member of an angular plate which is affixed to the bed 37. (See Figs. 18 and 19).

It is to be understood that my invention is not limited to the specific construction herein disclosed, but that the same may be modified within the principle of the invention and the scope of the appended claims.

I claim—

1. The combination, with a traveling shuck conveyer, of a chute having a delivery portion leading toward the upper path of said conveyer, a conveyer leading toward the receiving portion of the chute and adapted to support a row of shucks in endwise relation to each other and feed them successively toward the chute, actuating means for said latter conveyer, a head mounted for vertical reciprocation at the receiving portion of said chute and adapted to depress therein each succeeding shuck as rapidly as it is fed into the chute, and means for reciprocating said head.

2. The combination, with a traveling shuck conveyer, of a chute having a delivery portion leading toward the upper path of said conveyer, a conveyer leading toward the receiving portion of the chute and adapted to support a row of shucks in endwise relation to each other and feed them successively toward the chute, actuating means for said latter conveyer, a head mounted for vertical reciprocation at the receiving portion of said chute and having an inclined lower portion adapted to act upon and depress each succeeding shuck as rapidly as it is fed into the chute, and means for reciprocating said head.

3. The combination, with a traveling shuck conveyer, of a chute leading thereto, a conveyer leading toward the receiving portion of the chute and adapted to support a row of shucks in endwise relation to each other and feed them successively toward the chute, actuating means for said latter conveyer, means adjacent the chute for slightly depressing the top of each succeeding shuck before its delivery to the chute, a head mounted for vertical reciprocation at the receiving portion of said chute and adapted to depress therein each succeeding shuck as rapidly as it is fed into the chute, and means for reciprocating said head.

4. The combination, with a traveling shuck conveyer, of a chute leading thereto, a conveyer leading toward the receiving portion of the chute and adapted to support a row of shucks in endwise relation to each other and feed them successively toward the chute, actuating means for said latter conveyer, a roll mounted adjacent the chute and adapted to bear upon the top of each succeeding shuck, means for rotating said roll, a head mounted for vertical reciprocation at the receiving portion of said chute and adapted to depress therein each succeeding shuck as rapidly as it is fed into the chute, and means for reciprocating said head.

5. The combination, with a traveling shuck conveyer, of a chute leading thereto, a conveyer leading toward the receiving portion of the chute and adapted to support a row of shucks in endwise relation to each other and feed them successively toward the chute, actuating means for said latter conveyer, a roll mounted adjacent the chute and having a mutilated periphery adapted to bear upon the top of each succeeding shuck, means for rotating said roll, a head mounted for vertical reciprocation at the receiving portion of said chute and adapted to depress therein each succeeding shuck as rapidly as it is fed into the chute, and means for reciprocating said head.

6. The combination, with a traveling shuck conveyer, of a chute leading thereto and having a lateral inlet at its receiving portion, a conveyer leading toward said inlet and adapted to support a row of shucks in endwise relation to each other and feed them successively through the inlet into the chute, actuating means for said latter conveyer, a head mounted for vertical reciprocation at the receiving portion of said chute and in close relation to and across the inlet, and means for reciprocating said head.

7. The combination, with a traveling shuck conveyer, of a chute leading thereto, a conveyer leading toward the receiving portion of said chute and adapted to support a row of box shucks in endwise relation to each other and feed them successively toward the chute, actuating means for the latter conveyer, a shuck-supporting plate overlying the belt adjacent the chute, means located adjacent said supporting plate and adapted to act upon the top of each succeeding shuck immediately before its delivery to the chute, a head mounted to reciprocate in the chute and to depress therein each succeeding shuck as rapidly as it is fed into the chute, and means for reciprocating said head.

8. The combination, with a traveling shuck conveyer, of a chute leading thereto, a belt leading toward the receiving portion of said chute and adapted to support a row of box shucks in endwise relation to each other and feed them successively toward the chute, actuating means for the said belt, a shuck-supporting plate overlying the belt adjacent the chute, lateral shuck guide devices adjacent said plate, pressure means located above said supporting plate and adapted to act upon the top of each succeeding shuck immediately before its delivery to the chute, a head mounted to reciprocate in the receiving portion of the chute and adapted to depress therein each succeeding shuck as rapidly as it is fed into the chute, and means for reciprocating said head.

9. The combination, with a traveling shuck conveyer, of a chute leading thereto, spaced apart upper and lower belts between which a row of shucks is supported and fed toward the chute, the delivery end of the upper belt terminating short of the chute, means for concurrently actuating said belts, pressure means located between the chute and the delivery end of the upper belt and adapted to act upon the top of each succeeding shuck immediately before its delivery to the chute, a head mounted to reciprocate in the receiving portion of said chute and depress therein each succeeding shuck as rapidly as it is fed into the chute, and means for reciprocating said head.

10. The combination, with a traveling shuck conveyer, of a chute leading thereto, a shuck feeding belt leading toward the upper portion of the chute, actuating means for said belt, pressure means adjacent the chute for acting upon the top of each shuck before its delivery to the chute, a head mounted to reciprocate in the receiving portion of said chute and constructed to span and bear upon the upper longitudinal corners of each shuck when it is fed into the chute, and means for reciprocating said head.

11. The combination with a chute, of means for feeding shucks successively in endwise relation to each other into said chute, from one side of the latter, said means including pressure mechanism for acting upon the top of each succeeding shuck before its delivery to the chute, and means for bodily depressing each succeeding shuck as rapidly as it is fed into the chute.

12. The combination with a chute, of means for feeding shucks successively in endwise relation to each other into said chute, from one side of the latter, said means including a pressure roll adapted to bear upon the top of each succeeding shuck before its delivery to the chute, means for actuating said roll, and means for bodily depressing each succeeding shuck as rapidly as it is fed into the chute.

13. The combination with a chute, of means for feeding shucks successively in endwise relation to each other into said chute, from one side of the latter, said means including a pressure roll having a mutilated periphery adapted to bear upon the top of each succeeding shuck before its delivery to the chute, means for actuating said roll, and means for bodily depressing each succeeding shuck as rapidly as it is fed into the chute.

14. The combination with a chute, of a belt for feeding shucks successively in endwise relation to each other toward said chute, from one side of the latter, a pressure roll having a mutilated periphery adapted to bear upon the top of each succeeding shuck before its delivery to the chute, a shuck supporting plate below said roll, and means for bodily depressing each succeeding shuck as rapidly as it is fed into the chute.

15. The combination with a chute having a shuck inlet in one of its walls and an internal shoulder located on its opposite wall in a plane below the inlet, of means for feeding shucks in endwise relation to each other through said inlet into the chute, a head mounted for vertical reciprocation at the receiving portion of the chute and having a lower acting portion inclined downwardly from the inlet toward the shouldered wall of the chute, and means for reciprocating said head.

16. The combination, with a traveling shuck conveyer, of a chute leading thereto, a continuously moving shuck feeding belt leading toward the receiving portion of the chute, actuating means for said belt, means overlying the receiving portion of said belt for imposing shucks thereon in endwise relation to each other, a head mounted to reciprocate in the receiving portion of said chute and adapted to depress therein each succeeding shuck as rapidly as it is fed into the chute, and means for reciprocating said head.

17. The combination, with a traveling shuck conveyer, of a chute leading thereto, a shuck feeding belt leading toward the receiving portion of the chute, actuating means for said belt, means overlying the receiving portion of said belt for imposing shucks thereon in endwise relation to each other, each shuck resting upon one of its long narrow edges, means for tilting said shucks upon their broad sides before their delivery to the chute, a head mounted to reciprocate in the receiving portion of said chute and adapted to depress therein each succeeding shuck as rapidly as it is fed into the chute, and means for reciprocating said head.

18. The combination, with a shuck feeding belt and actuating means therefor, of a shuck receptacle overlying a portion of said belt and having a throat portion at one end, a pair of spaced-apart screw shafts mounted within and longitudinally of said receptacle, means for actuating said shafts to effect the feeding of shucks contained in said receptacle toward the throat, polygonal shafts arranged above and longitudinally of said screw shafts, and means for rotating said latter shafts.

19. The combination, with a shuck feeding belt and actuating means therefor, of a shuck receptacle overlying said belt and having a throat portion at one end, a pair of spaced-apart screw shafts mounted within and longitudinally of said receptacle, means for actuating said shafts to effect the feeding of shucks contained in said receptacle toward the throat and to permit them to fall upon their long narrow sides upon the belt and in that condition to pass through the throat, and means exteriorly of the throat for tilting said shucks and causing their broad sides to rest on the belt.

20. The combination, with a shuck feeding belt and actuating means therefor, of a shuck receptacle overlying said belt and having a throat portion at one end, a pair of spaced-apart screw shafts mounted within and longitudinally of said receptacle, means for actuating said shafts to effect the feeding of shucks contained in said receptacle toward the throat and to permit them to fall upon their long narrow sides upon the belt and in that condition to pass through the throat, polygonal shafts arranged above and longitudinally of said screw shafts, means for rotating said latter shafts, and means exteriorly of the throat for tilting said shucks and causing their broad sides to rest on the belt.

Signed at Barberton, in the county of Summit and State of Ohio this 16th day of January, A. D. 1920.

HENRY C. SCHUMACHER.